United States Patent
Hardi

(10) Patent No.: US 10,088,921 B2
(45) Date of Patent: Oct. 2, 2018

(54) DEVICES FOR SHARING USER INTERACTIONS

(71) Applicant: Muzik LLC, Miami Beach, FL (US)

(72) Inventor: Jason Hardi, Miami Beach, FL (US)

(73) Assignee: Muzik Inc., Raleigh, NC (US)

( * ) Notice: Subject to any disclaimer, the term of this patent is extended or adjusted under 35 U.S.C. 154(b) by 239 days.

(21) Appl. No.: 14/879,803

(22) Filed: Oct. 9, 2015

(65) Prior Publication Data

US 2016/0231834 A1 Aug. 11, 2016

Related U.S. Application Data

(60) Provisional application No. 62/062,672, filed on Oct. 10, 2014.

(51) Int. Cl.
*G06F 3/0354* (2013.01)
*G06F 3/16* (2006.01)
(Continued)

(52) U.S. Cl.
CPC ...... *G06F 3/03547* (2013.01); *G06F 3/04883* (2013.01); *G11B 27/34* (2013.01);
(Continued)

(58) Field of Classification Search
CPC ............. G06F 3/03547; G06F 3/04883; G06F 3/0354; G06F 3/0488; G06F 3/0487; G06F 3/04847; G06F 3/0484; G06F 3/0486; G06F 3/1454; G06F 3/1423; G06F 3/14; G06F 3/165; G06F 3/162; G06F 3/16; G06F 15/16; G06F 15/17; G06F 3/142; G10H 1/0008; G10H 1/053;
G10H 2220/096; G10H 2220/091; G10H 2220/311; G10H 2220/261; G10H 2220/391; G10H 2220/395; G10H 2230/015; G10H 2230/081; G10H 2230/215; G10H 2230/245; G10H 2240/305;
(Continued)

(56) References Cited

U.S. PATENT DOCUMENTS 5,872,924 A 2/1999 Nakayama
5,880,743 A 3/1999 Moran
(Continued)

FOREIGN PATENT DOCUMENTS

KR 10-2008-0004229 A 1/2008
KR 10-2011-0107477 A 10/2011

OTHER PUBLICATIONS

Inside Pandora Web Radio. Published at http://www.oreilly.com/digitalmedia/2006/08/17/inside-pandora-web-radio.html on Aug. 17, 2006 as archived at https://web.archive.org/web/20130604045150/http://oreilly.com:80/digitalmedia/2006/08/17/inside-pandora-web-radio.html on Jun. 4, 2013.*
(Continued)

*Primary Examiner* — Julie Anne Watko
(74) *Attorney, Agent, or Firm* — Ward and Smith, P.A.

(57) ABSTRACT

A method, such as a computer implemented method, of data management, wherein content utilized by a first user can be identified and information about such content can be shared to at least one additional user such that the at least one additional user can pull the identified content from the content source.

20 Claims, 21 Drawing Sheets

(51) Int. Cl.
| | | |
|---|---|---|
| *G11B 27/34* | (2006.01) | |
| *G06F 3/0488* | (2013.01) | |
| *G06F 3/14* | (2006.01) | |
| *H04L 12/58* | (2006.01) | |
| *G10H 1/00* | (2006.01) | |
| *G06F 15/16* | (2006.01) | |
| *H04L 12/28* | (2006.01) | |

(52) U.S. Cl.
CPC .......... *H04L 51/046* (2013.01); *H04L 51/063* (2013.01); *H04L 51/10* (2013.01); *G06F 3/1454* (2013.01); *G06F 3/165* (2013.01); *G06F 15/16* (2013.01); *G10H 1/0008* (2013.01); *G10H 2220/096* (2013.01); *G10H 2220/311* (2013.01); *G10H 2220/391* (2013.01); *G10H 2220/395* (2013.01); *G10H 2230/015* (2013.01); *G10H 2230/281* (2013.01); *G10H 2240/105* (2013.01); *G10H 2240/145* (2013.01); *G10H 2240/155* (2013.01); *G10H 2240/305* (2013.01); *G10H 2240/321* (2013.01)

(58) Field of Classification Search
CPC ....... G10H 2240/321; G10H 2240/281; G10H 2240/241; G10H 2240/205; G10H 2240/201; G10H 2240/181; G10H 2240/155; G10H 2240/145; G10H 2240/105; G10H 2230/281; G11B 27/34; G11B 27/11; H04L 51/04; H04L 51/02; H04L 51/00; H04L 51/063; H04L 51/08; H04L 51/046; H04L 51/066; H04L 51/10
See application file for complete search history.

(56) References Cited

U.S. PATENT DOCUMENTS

| | | | |
|---|---|---|---|
| 6,057,845 A | 5/2000 | Dupouy | |
| 6,476,834 B1 | 11/2002 | Doval | |
| 6,956,562 B1 | 10/2005 | O'Hara | |
| 7,004,394 B2 | 2/2006 | Kim | |
| 7,030,861 B1 | 4/2006 | Westerman | |
| 7,479,949 B2* | 1/2009 | Jobs ...................... | G06F 3/0488 345/169 |
| 7,631,811 B1 | 12/2009 | Brown | |
| 7,653,816 B2* | 1/2010 | Avritch ................ | G06Q 10/107 713/176 |
| 7,774,411 B2* | 8/2010 | LeMay ................. | H04L 63/045 709/206 |
| 7,925,029 B2 | 4/2011 | Hollemans | |
| 8,169,414 B2 | 5/2012 | Lim | |
| 8,203,502 B1 | 6/2012 | Chi | |
| 8,223,088 B1 | 7/2012 | Gomez | |
| 8,448,083 B1 | 5/2013 | Migos | |
| 8,571,544 B2 | 10/2013 | Pelland et al. | |
| 8,655,420 B1 | 2/2014 | Pelland et al. | |
| 8,677,285 B2 | 3/2014 | Tsern | |
| 8,819,597 B2 | 8/2014 | Li | |
| 8,873,147 B1* | 10/2014 | Rhodes .............. | G02B 27/0172 359/630 |
| 8,941,560 B2 | 1/2015 | Wong | |
| 9,035,878 B1 | 5/2015 | Wheeler | |
| 9,046,999 B1 | 6/2015 | Teller | |
| 9,064,436 B1 | 6/2015 | Patel | |
| 9,292,082 B1 | 3/2016 | Patel | |
| D793,356 S * | 8/2017 | Hardi ......................... | D14/205 |
| 2003/0014615 A1 | 1/2003 | Lynggaard | |
| 2003/0115059 A1 | 6/2003 | Jayaratne | |
| 2003/0131060 A1* | 7/2003 | Hartselle ............. | G06Q 10/107 709/206 |
| 2004/0145574 A1 | 7/2004 | Xin | |
| 2005/0022130 A1 | 1/2005 | Fabritius | |
| 2005/0047629 A1 | 3/2005 | Farrell | |
| 2005/0212751 A1 | 9/2005 | Marvit | |
| 2005/0216867 A1 | 9/2005 | Marvit | |
| 2006/0215847 A1 | 9/2006 | Hollemans et al. | |
| 2006/0233413 A1* | 10/2006 | Nam ..................... | H04R 1/1041 381/380 |
| 2007/0003098 A1 | 1/2007 | Martenson | |
| 2007/0022163 A1* | 1/2007 | Wormald ................ | H04L 51/04 709/206 |
| 2007/0052672 A1 | 3/2007 | Ritter | |
| 2007/0098263 A1 | 5/2007 | Furukawa | |
| 2007/0177803 A1 | 8/2007 | Elias | |
| 2007/0206829 A1* | 9/2007 | Weinans .............. | H04M 1/6066 381/370 |
| 2007/0237170 A1* | 10/2007 | Proctor ................ | H04R 1/1033 370/462 |
| 2008/0120576 A1 | 5/2008 | Kariathungal | |
| 2008/0168403 A1* | 7/2008 | Westerman ......... | G06F 3/04883 715/863 |
| 2008/0235621 A1 | 9/2008 | Boillot | |
| 2009/0073144 A1* | 3/2009 | Chen ..................... | G06F 3/0231 345/179 |
| 2009/0257604 A1* | 10/2009 | Yeates .................. | H01H 9/0228 381/105 |
| 2009/0265670 A1 | 10/2009 | Kim | |
| 2009/0274317 A1* | 11/2009 | Kahn .................. | H04M 1/6066 381/74 |
| 2009/0283341 A1 | 11/2009 | Lin | |
| 2010/0169075 A1 | 7/2010 | Raffa | |
| 2010/0293462 A1 | 11/2010 | Bull | |
| 2011/0001699 A1 | 1/2011 | Jacobsen | |
| 2011/0041102 A1 | 2/2011 | Kim | |
| 2011/0102464 A1 | 5/2011 | Godavari | |
| 2011/0227871 A1 | 9/2011 | Cannon | |
| 2011/0136797 A1 | 12/2011 | Johansson | |
| 2012/0065815 A1 | 3/2012 | Hess | |
| 2012/0069243 A1 | 3/2012 | Beemster | |
| 2012/0192050 A1* | 7/2012 | Campbell ............... | G06Q 10/06 715/212 |
| 2012/0216152 A1 | 8/2012 | Li | |
| 2012/0236025 A1 | 9/2012 | Jacobsen | |
| 2012/0274662 A1 | 11/2012 | Kim | |
| 2013/0002545 A1* | 1/2013 | Heinrich ............... | G06F 3/0485 345/157 |
| 2013/0021269 A1 | 1/2013 | Johnson | |
| 2013/0194301 A1* | 8/2013 | Robbins ................. | G06F 21/60 345/629 |
| 2013/0339859 A1 | 12/2013 | Hardi | |
| 2014/0111427 A1 | 4/2014 | Lindley | |
| 2014/0241564 A1* | 8/2014 | Kang ..................... | H04R 7/045 381/386 |
| 2014/0331188 A1* | 11/2014 | Sandstrom .......... | G06F 3/04883 715/863 |
| 2015/0070274 A1* | 3/2015 | Morozov ............... | G06F 3/0346 345/156 |
| 2015/0169505 A1* | 6/2015 | Kim ...................... | G06F 3/0484 715/269 |
| 2015/0222686 A1* | 8/2015 | Aizenstat .............. | H04L 65/602 709/204 |
| 2016/0100244 A1* | 4/2016 | Gentile ................ | H04R 1/1041 345/174 |
| 2017/0063751 A1* | 3/2017 | Korboulewsky-Braustein ............ H04L 51/08 |
| 2017/0293351 A1* | 10/2017 | Li ........................... | G06F 3/012 |
| 2017/0366949 A1* | 12/2017 | Brooks .................. | H04L 51/24 |
| 2018/0077096 A1* | 3/2018 | DeMattei ................ | H04L 51/10 |

OTHER PUBLICATIONS

Stella. "Open Pandora Radio's box with these 9 tips". Published at https://www.digitaltrends.com/music/tips-and-tricks-for-pandora-radio/ on May 6, 2014 as archived at https://web.archive.org/web/20140508015956/https://www.digitaltrends.com/music/tips-and-tricks-for-pandora-radio/ on May 8, 2014.*
International Search Report and Written Opinion, PCT/US2015/054973, dated Jan. 26, 2016, 8 pages.

(56) References Cited

OTHER PUBLICATIONS

International Preliminary Report on Patentability, PCT/US2013/045900, dated Dec. 16, 2014, 7 pages.
International Search Report and Written Opinion, PCT/US2013/045900, dated Oct. 1, 2013, 14 pages.
International Preliminary Report on Patentability, PCT/US2013/045851, dated Dec. 16, 2014, 9 pages.
International Search Report and Written Opinion, PCT/US2013/045851, dated Oct. 18, 2013, 14 pages.

* cited by examiner

MAIN PROCESSOR ANALOG INPUT/MEDIA DEVICE ANALOG OUTPUT
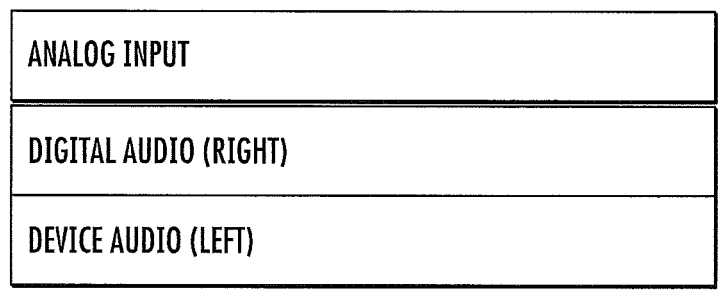
MAIN PROCESSOR ANALOG OUTPUT/MEDIA DEVICE ANALOG INPUT
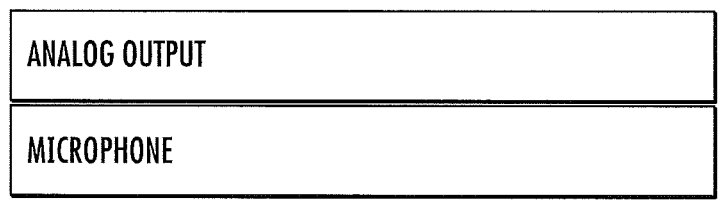
FIG. 8

MOBILE SOFTWARE DEVELOPMENT KIT

| SDK PACKET TRANSLATION ||
|---|---|
| DIGITAL AUDIO DATA (MICROPHONE) | PASS-THROUGH |
| TOUCH GESTURE DETERMINATIONS<br>1. FORWARD SWIPE<br>2. BACKWARD SWIPE<br>3. UPWARD SWIPE<br>4. DOWNWARD SWIPE<br>5. UP HOLD<br>6. DOWN HOLD<br>7. RIGHT HOLD<br>8. LEFT HOLD | COMMAND MAPPING/<br>INTERPRETATION (CUSTOMIZABLE)<br>1. NEXT TRACK<br>2. PRECIOUS TRACK<br>3. INCREASE VOLUME<br>4. DECREASE VOLUME<br>5. FAVORITE TRACK<br>6. SAVE TRACK TO PERSON PLAYLIST<br>7. SHARE TO TWITTER<br>8. SHARE TO FACEBOOK |
| ACCELEROMETER DATA (X,Y,Z) | PASS-THROUGH |
| GYROSCOPE DATA (X,Y,Z) | PASS-THROUGH |
| COMPASS DATA (0-360 DEGREES) | PASS-THROUGH |
| BATTERY STATUS 0-100 | PASS-THROUGH |
| BUILT IN TEST STATUS | PASS-THROUGH |
| PROXIMITY READING<br>1. HEAD NOT PRESENT<br>2. HEAD PRESENT | COMMAND MAPPING/INTERPRETATION<br>1. PAUSE TRACK<br>2. PLAY TRACK |

*FIG. 9*

○ SINGLE BUTTON HOLD WHEN UNIT IS OFF: POWER ON UNIT
○ SINGLE BUTTON PRESS WHEN UNIT IS ON: PLAY/PAUSE
○ SHORT DOUBLE PRESS WHEN UNIT IS ON: SMARTPHONE VOICE CONTROL ACTIVATION
○ SHORT HOLD WHEN UNIT IS ON: SMARTPHONE VOICE CONTROL ACTIVATION
○ SHORT HOLD WHEN UNIT IS ON: ENTER PAIRING MODE
○ LONG HOLD WHEN UNIT IS ON: POWER OFF UNIT
* PAIRING HEADPHONES AND DEVICE WITH BLUETOOTH:
○ FIRST TIME PAIRING:
* USER BRIEFLY HOLDS POWER BUTTON TO TURN UNIT ON
* OPTION 1: USER ENABLES NFC ON DEVICE AND HOLDS DEVICE NEARBY LEFT EARBUD OF HEADPHONES
* DEVICE PAIRS WITH HEADPHONES
* OPTION 2: USER ENTERS DEVICE SETTINGS AND SELECTS MUZIK MZHP1 IN THE BLUETOOTH DEVICES LIST AND SELECTS DEVICE TO PAIR
* DEVICE PAIRS WITH HEADPHONES
○ NORMAL USE PAIRING:
* USER BRIEFLY HOLDS POWER BUTTON TO TURN UNIT ON
* HEADPHONES AUTOMATICALLY PAIR WITH DEVICE

FIG. 10

DEVICES FOR SHARING USER INTERACTIONS

CROSS REFERENCE TO RELATED APPLICATIONS

This application claims the benefit of priority to U.S. Provisional Application No. 62/062,672; DEVICES FOR SHARING USER INTERACTIONS; filed Oct. 10, 2014, which is incorporated by reference in its' entirety.

BACKGROUND

This specification relates to remote input devices and more specifically input devices integrated with output devices. Computing devices are commonly used by a user to perform a wide variety of functions. A user issues commands to a computing device by interacting with one or more controls, the input is often done through an input device such as a keyboard, touchpad, mouse, or touchscreen. The computing device outputs content in response to the user commands in various forms via a video monitor, speaker, headphones or other sensory/perceptive device(s). It may be desirable to input controls and commands to the computing device directly from the output device, such as inputting commands to an audio player via a headphone or interacting with a social media channel in real time via a headphone as an audio file is played. With the exception of rudimentary output commands such as "play," "stop," "pause," and "volume," current output devices do not allow for controls or input to software programs running on the computing device.

SUMMARY

This specification describes technologies relating to interactive remote input devices and interactive output devices, such as, for example and without limitation network connected interactive headphones, interactive dongles, interactive cables, interactive speakers, interactive music instruments, and interactive hand controllers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a diagram illustrating direct analog input/output.

FIG. 9 shows an example of packet translation.

FIG. 10 shown example button-based operations.

DETAILED DESCRIPTION

Figure 1:
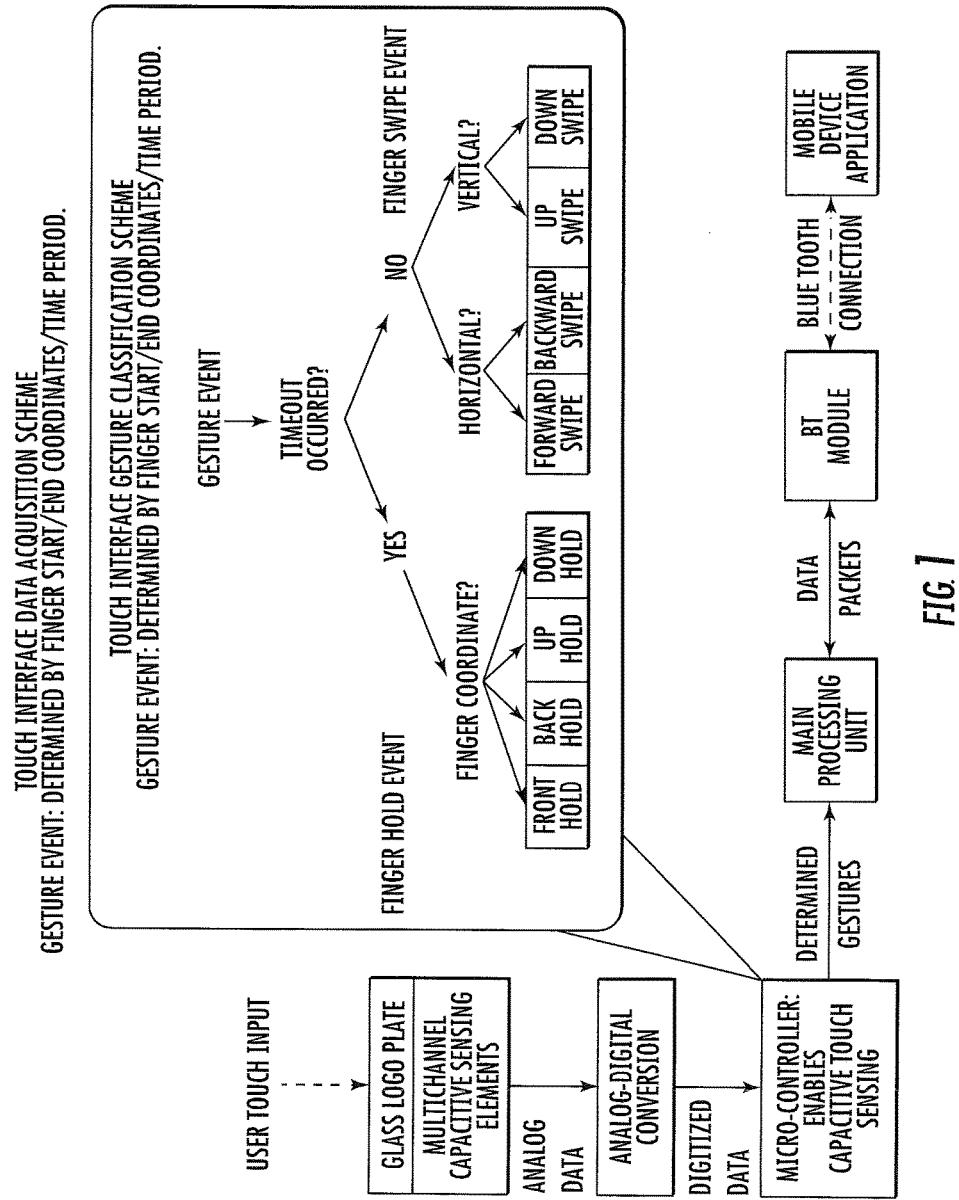
FIG. 1 is diagram of an example system for accepting, interpreting, and transmitting user input.

Broadly, an implementation of the technology includes a system that allows multiple users to share information about themselves, their interests, and their media content with others. In an example implementation, a user can use a personal electronic device (e.g., a computer, media player, cellular phone, tablet computer, or other electronic device) to enter information about himself and his interests. For instance, a user can enter his name and his personal interests (e.g., music, movies, TV, video game, book, sports, hobbies, celebrities, and other interests). The user can also use the device to consume media, for example to listen to music, watch movies and TV shows, read books, view images, and so forth. The user can also use the device to perform other activities, such as play video games, take photographs, compose and perform music, create videos, or other create content (e.g., write, draw, and so forth).

Information regarding the user and his interests and activities can be shared with other users, such that the other users are able to share in the user's experiences. In some implementations, sharing information between users can include directly sending content between users; for example, in some cases, a user can transmit a song that he is listening to other users, such that the other users can listen to that song as well. In some implementations, sharing information between users can include indirectly sending content between users; for example, in some cases, a user can transmit metadata regarding a song that he is listening to other users, such that the other users can independently acquire that song and listen to the song. In this manner, users can share information and content with other users either directly or indirectly.

In some implementations, a user can input information and commands to the system using a control device other than his personal electronic device. For example, in some implementations, a control device can be used in conjunction with the personal electronic device that allows a user to control the operation of the computing device without directly handling the personal electronic device itself. In example implementations, the personal electronic device may be controlled from an audio output device (e.g., a headphone, speaker, ear bud, or speaker cable), a video output device (e.g., a screen or monitor, a heads-up display, a video-enabled pair of glasses or visor, or other portable video output device), or even a remote input device disassociated with the personal electronic device, such as a steering wheel, a dash board panel, a visual or audio kiosk, a musical instrument, and the like.

Providing input to the personal electronic device from an interactive output device or remote input device allows the user to interact with the personal electronic device in a more convenient manner. For instance, a user may use the control device to interact with the personal electronic device without first having to remove the personal electronic device from a storage location (e.g., a clothing pocket, a carrying bag, a holding bracket, an armband, etc.). In this manner, a user may use the control device to operate the personal electronic device without exposing the personal electronic device to potential damage due to mishandling or environmental factors. The user may also use the control device to operate a personal electronic device that is not readily accessible, for example a device that is secured in a case or a protective housing, or built into a fixed enclosure (e.g., a household audio system or a media system in a vehicle).

In another example, a user may use the control device to interact with the personal electronic device without having to look at either the control device or the personal electronic device. In this manner, a user may use the personal electronic device while engaging in other activities, such as walking, running, reading, driving, or any other activity where averting one's attention is undesirable. In addition, a user may use the control device to simplify specific tasks of the personal electronic device, such that the user may issue complex instructions to the personal electronic device using relatively simple inputs on the control device. For example, in some implementations the user may share or "like" content, such as a music recording being played on a mobile phone and delivered to the user via an output device such as headphones, where the headphones include an input component such that the user can communicate preferences for the music file with other users over a social network by simple manipulation of the input device on the headset.

An example system for accepting, interpreting, and transmitting user input is shown in FIG. 1. In this example, the system inputs an input interface module, an analog-digital conversion module, a micro-controller module, a main processing unit, a Bluetooth module, and a mobile device application.

The input interface module includes one or more components that receive input from a user. For instance, the input interface module can include one or more touch-sensitive elements (e.g., capacitive sensing elements) that can detect a user's touch. Other touch-sensitive elements can also be used, such as resistive sensing elements. In some implementations, the input interface module can also include components such as buttons, switches, dial, levers, and other components that can be physically manipulated by a user. In some implementations, portions of the input interface module can protected by a protective layer or enclosure, such as a layer or enclosure of glass, metal, or plastic. For example, several capacitive sensing elements can be covered by a glass place in order to protect the sensing elements from being damaged.

The input interface module detects inputs from the user in the form of analog electrical signals. These electrical signals can be converted (e.g., "transformed") into digital information such that they can be more readily interpreted by digital electrical devices. In some implementations, this is performed by an analog-digital conversion module that accepts analog signals (e.g., analog electrical waveforms) and converts them into digital information (e.g., binary information).

The digitized information is transmitted to the micro-controller for interpretation. The micro-controller can, for example, analyze the digitized information in order to determine a particular gesture made by the user on the input interface module. For instance, the user might touch the input interface module in a particular pattern (e.g., by swiping upward from the bottom of a touch-sensitive element to the top, by swiping leftward from the left of a touch-sensitive element to the right, or by swiping a particular pattern on the touch-sensitive element such as a "Z"). The user might also touch the input interface module for a particular length of time (e.g., briefly touch the touch interface module, or hold his touch against the touch interface module). The micro-controller receives digitized information that describes this interaction (e.g., information describing the location, time, force, and movement), and identifies the gesture (e.g., a directionally dependent swipe, location-dependent touch, location-dependent hold, and so forth).

Information regarding the identified gesture is transmitted to a main processing unit. The main processing unit aggregates the gesture information with other information generated by other components of the device and creates data packets. For example, if the illustrated system a part of a sensor-equipped headphone (or other audio playback device), the headphone might generate information such as digital audio data (e.g., from a built-in microphone), sensor information (e.g., from an accelerometer, gyroscope, compass, and/or proximity sensor), power information (e.g., battery status), and other information. This information, along with the gesture information, is aggregated into one or more data packets. Each data packet need not include all of the available information. For example, in some cases, a data packet might include only a portion of the information (e.g., only information regarding a touch gesture). Further, available information can be spread out over several data packets; for example, digital audio data might be partitioned into several different portions and included across multiple data packets.

The data packets are transmitted to a mobile device application. For example, in some implementations, the data packets can be transmitted via a Bluetooth module that transmits and receives data between the system and the mobile device using the Bluetooth communications protocol. Although a Bluetooth module is shown in FIG. 1, this is merely an example. In some implementations, data packets can be transmitted using other components, such as using a Wi-Fi radio, cellular radio, infrared transceiver, wired connection, or other communications device.

Figure 2:
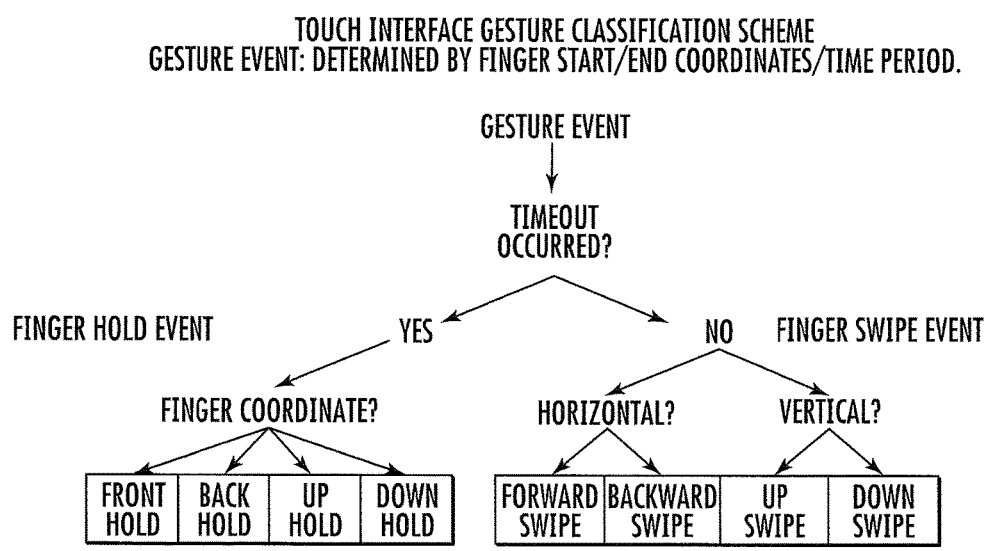
FIG. 2 is a diagram of an example technique for interpreting user interactions with an input interface module.

As described above, the micro-controller module analyzes the digitized information corresponding to a user's interactions with the input interface module in order to identify a particular gesture made by the user. This can be performed in a variety of ways. An example technique is shown in FIG. 2. Here, the micro-controller receives digitized data corresponding to a user's interactions with the input interface module. As the user may be interaction with the input interface module for a period of time (e.g., holding a touch for a period of time, swiping over a period of time, or interaction over a period of time), digitized data might correspondingly be received over a period of time. When a certain amount of time was elapsed since the last data is received (e.g., a "timeout time" has elapsed), the micro-controller determines that the interaction event is over and interprets the digitized data received for that interaction event.

If the micro-controller module determines that the user touched the sensing elements for a length of time that exceeds a particular threshold amount of time, the micro-controller determines that a "hold" gesture has been performed. The micro-controller module then identifies the portion of the sensing elements that were touched (e.g., the front, back, top, bottom, and so forth), and identifies an appropriate gesture (e.g., "front hold," "back hold," "up hold," and "down hold").

If the micro-controller module determines that the user touched the sensing elements for a length of time that did not exceed a particular threshold amount of time, the micro-controller determines that a "hold" gesture has not been performed. The micro-controller module then determines if another type of gesture was performed. For example, the micro-controller can determine if the digitized information corresponds to a directionally dependent swipe (e.g., "forward swipe," "backward swipe," "up swipe," or "down swipe"). Although example gestures are shown in FIG. 2, this is merely an illustrative example. In practice, different techniques can be used to detect other gestures in addition to or instead of those shown.

Figure 3:
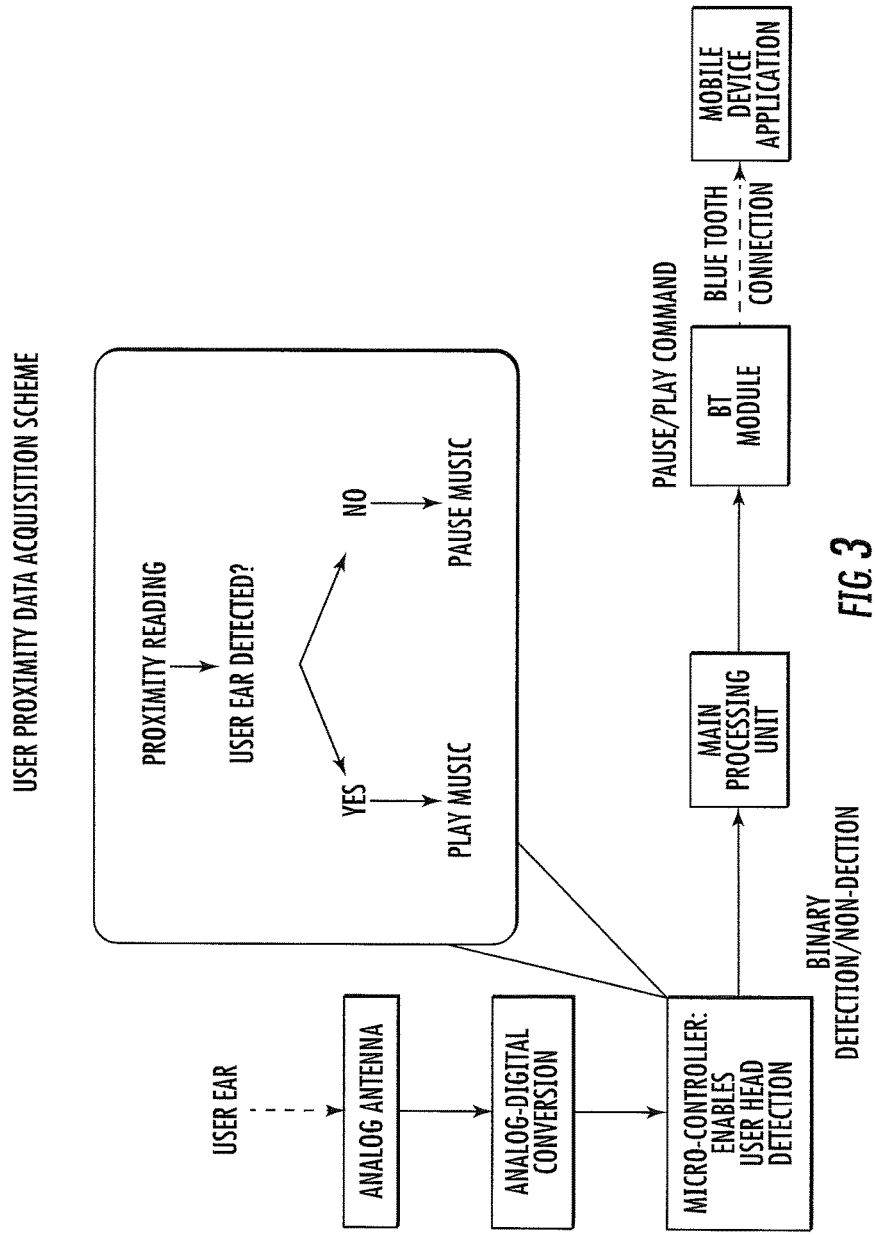
FIG. 3 is diagram of an example system for collecting and interpreting proximity information.

In the example shown in FIG. 1, information from touch-sensitive elements is collected and interpreted by the system, and gesture information is transmitted to other devices. However, this is not limitedly only to gesture information. For example, referring to FIG. 3, in some implementations, the system can collect and interpret information pertain to the proximity of the system to a user. For example, the system can include a proximity sensor (e.g., an analog antenna, pressure sensor, infrared sensor, or other such sensor) that detects when the device is in proximity with a user. In some cases, information outputted from the sensor can be in the form of analog signals. These analog signals can be converted into digital information in a similar manner as discussed above (e.g., using an analog-digital conversion module). Likewise, this digitized information can be interpreted by the micro-controller module. For example, the micro-controller module can determine, based on the digitized information, whether the system is in proximity with the user (e.g., a user's ear) or remote from the user (e.g., away from a user's ear). In a similar manner as above, this proximity information can be transmitted to other devices (e.g., a mobile device application) in a similar manner as discussed above.

In some implementations, the micro-controller module can also select particular commands based on the proximity. For example, in the case of a headphone, if the micro-controller module determines that the system is in proximity with a user, the micro-controller can select a "play music" command, such that music is played to the user. If the micro-controller module determines that the system is not in proximity with a user, the micro-controller can select a "pause music" command, such that music playback is paused. Although example commands are shown, these are merely examples, and other commands are also possible, either in addition to or instead of those shown above. In a similar manner as above, these commands can be transmitted to other devices (e.g., a mobile device application) in a similar manner as discussed above.

Figure 4:
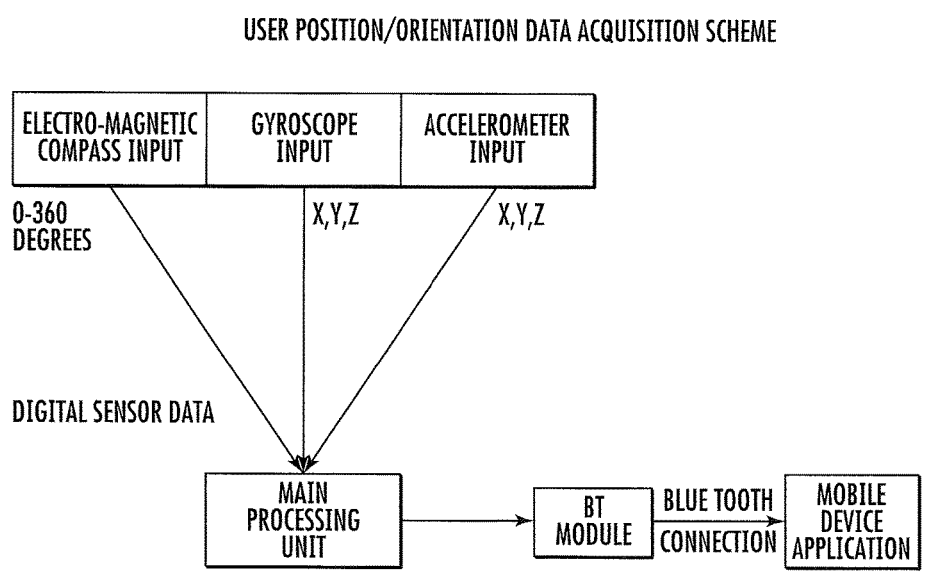
FIG. 4 is a diagram of an example system for collecting sensor data.

As discussed above, in some cases, the system can collect additional sensor, for sensor data from an accelerometer, gyroscope, and/or compass. Referring to FIG. 4, sensor information can be transmitted from one or more of these sensors of the main processing unit for aggregation into data packets. In the example shown in FIG. 4, the output of the sensors is digital data and can be directly transmitted to the main processing unit. In implementations where these sensors output analog data, the analog data can be first transmitted to the analog-digital conversion module and converted into digitized information in a similar manner as discussed above.

As discussed above, in some implementations, the system can be a part of a headphone or other audio playback device. For example, referring to FIG. 5, the system can include one or more components that provide audio playback or audio recording capabilities. For example, the system can include one or more microphones to record audio and one or more analog-to-digital convertors to convert analog audio information recorded by the microphones into digitized information. This digitized information can be transmitted to the main processing unit for further processing. For example, the main processing unit can perform digital signal processing and noise cancellation to improve, enhance, or otherwise alter the recording. After processing, digitized information corresponding to the recording can be aggregated into data packets (e.g., as described above) and/or transmitted to one or more speakers for playback. For example, the digitized information can be transmitted to one or more digital audio converters (DACs) and the converted audio information can be transmitted to one or more speakers for playback to the user.

Figure 6:
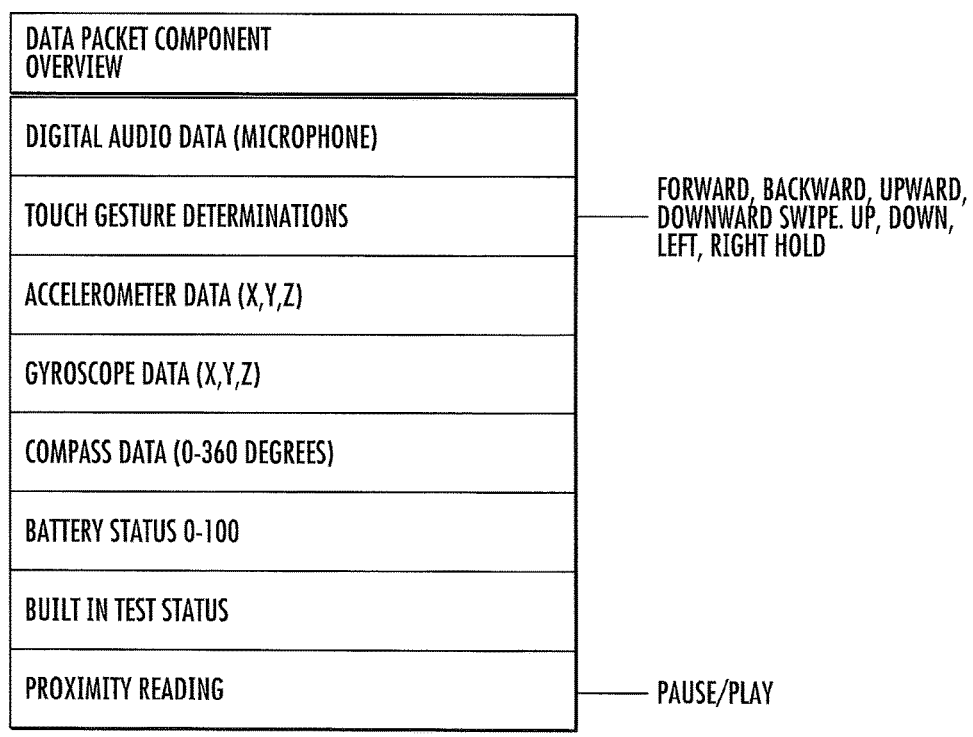
FIG. 6 is a diagram of an example data packet.

As described above, the main processing unit aggregates the information such as gesture information, sensor information, and other information into one or more data packets. An example data packet is shown conceptually in FIG. 6. As shown in FIG. 6, a data packet can include digital audio information (e.g., corresponding to audio recorded by the microphone), gesture information determined by the micro-controller module, sensor information (e.g., accelerometer, gyroscope, compass, and proximity data), battery status information, and other information (e.g., build-in test status and diagnostic information). As discussed above, each data packet need not include all of the available information. For example, in some cases, a data packet might include only a portion of the information (e.g., only information regarding a touch gesture). Further, available information can be spread out over several data packets; for example, digital audio data might be partitioned into several different portions and included across multiple data packets. Further still, although example contents of a data packet are shown above, this is only an example. In practice, a data packet can include other information, either in addition to or instead of that described above.

Figure 7:
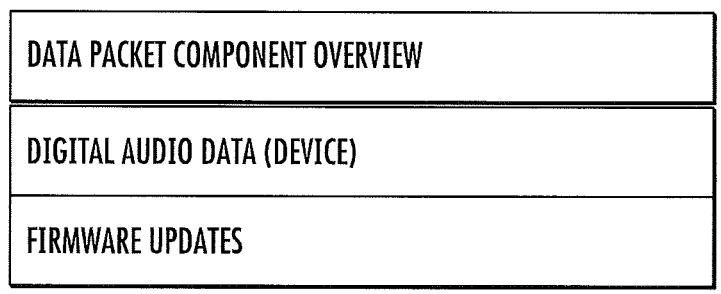
FIG. 7 is a diagram of another example data packet.

In some implementations, the system can also receive data packets. Referring to FIG. 7, as an example, a received data packet can include digital audio data from a connected device (e.g., the mobile device application). The system can process the received digital audio data (e.g., using the main processing unit), convert the digital audio data into analog signals (e.g., using the DACs), and playback the analog audio using the one or more speakers. As another example, a received data packet can include firmware or software updates in order to update firmware or software implemented on the system. In this manner, the operation of the system can be revised and improved over time.

In the example shown in FIG. 7, the system can receive digital audio data, convert the digital audio data into analog signals, and playback the audio. In some implementations, the system can directly accept analog audio for playback by the speakers. For example, referring to FIG. 8, the device can accept analog input (e.g., from an analog input interface) and directly play the audio using the one or more speakers.

Figure 5:
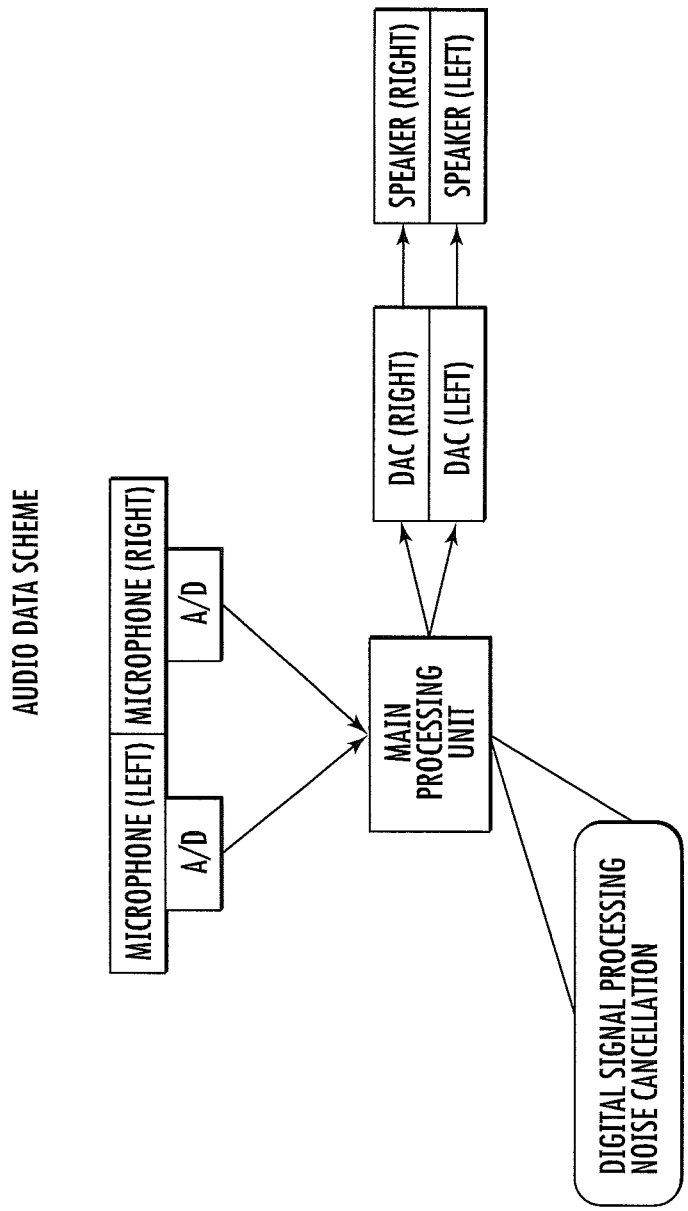
FIG. 5 is a diagram of an example audio system.

In the example shown in FIG. 5, the system can receive analog signals from a microphone, convert the analog signals into digitized information, and transmit the digitized information as a part of data packets. In some implementations, the system can directly output analog signals corresponding to the audio recorded by the microphone. For example, referring to FIG. 8, analog signals output by the microphone can be directly output through an analog output interface.

Data packets received by the mobile device application can be used in a variety of ways. In some implementations, the data packets received by the mobile device application can be "translated" into corresponding commands that are appropriate to the mobile device application. For example, referring to FIG. 9, if the mobile device application includes audio playback functionality (e.g., a media player), the mobile device application can translate the gesture information in the data packets into media playback-related functions. For instance, a forward swipe can be translated into a "next track" command, a backward swipe can be translated into a "previous track" command, and so forth. Commands that are not used by that particular mobile device application can be ignored, discarded, or passed-through to other applications. Although an example packet translation is shown in FIG. 9, this is merely an example. Other commands can be associated with each of the gestures, depending on the implementation. Further, although an example audio playback application is shown in FIG. 9, this is also merely an example. Other types of applications and functions can also be used in conjunction with packet translation. In some implementations, packet translation can be included as a part of a software development kit (SDK) that provides developers with a standardized tools for building applications capable of interpreting data packets and translating them into commands.

As described above, in some implementations, the input interface module can include one or more components other than touch-sensitive elements, buttons, switches, dial, levers, and other components that can be physically manipulated by a user. Each of these components can be associated with one or more commands, such that the user can perform various tasks. For example, the system can include a button that allows the user to control system power and/or synchronization. Depending on a particular pattern in which the user presses the button, the system can perform different tasks. An example of these operations is shown in FIG. 10. Although example patterns and tasks are shown in FIG. 10, these are merely examples. In practice, other combinations and tasks are also possible. Further, multiple buttons and/or other components can also be used to control various aspects of the system.

As described above, in some implementations, a system can allow multiple users to share information about themselves, their interests, and their media content with others. This can be performed in a variety of ways. For example, referring to FIG. 11A, a system can include multiple client devices, each with a respective mobile application. Each of these client devices can be, for example, a personal electronic device such a cellular phone, tablet, media player, personal computer, and so forth. Here, the user using the first client device wants to share information regarding himself, his interests, and his media content with others. In some implementations, the shared information includes information (e.g., metadata) regarding a particular media content item. For example, the first client may indicate that he enjoys a particular song, movie, or TV show, or that he is currently listening to a particular song, or watching a particular movie or TV show. This information is transmitted from the first client device to a server (e.g., a "cloud" server) that accepts the transmitted data and stores it for further retrieval. In some implementations, the server can be a part of a service that provides users with a personal account for storing information. This information can also be transmitted to a social media server (e.g., a server operated by Facebook, Twitter, Google+ and so forth). Information can be transmitted over a network, such as a WAN (e.g., the Internet), a LAN (e.g., an Ethernet or Wi-Fi network), or any other wired or wireless network.

Figure 11A:
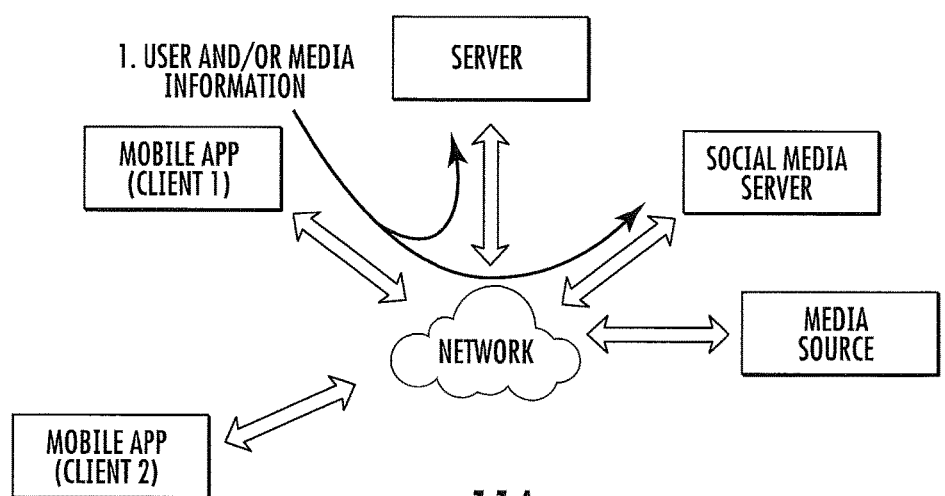
FIGS. 11A-D show an example process of exchanging data between clients.
Figure 11B:
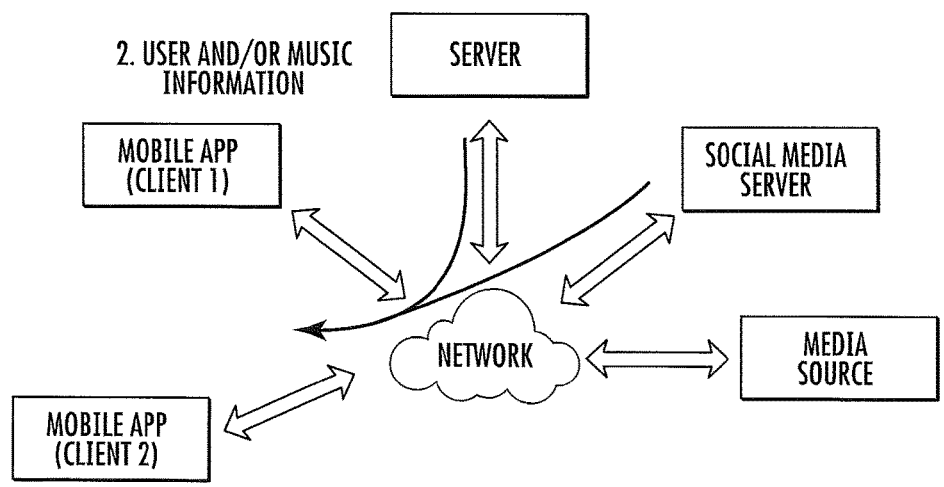

Referring to FIG. 11B, information transmitted by the first client can be shared with a second client. For example, information shared by the first client can be transmitted from the server and/or the social media server to the mobile application of the second client device. In some implementations, the second client can freely receive data shared by the first client. In some implementations, the second client must first receive permission to receive data shared by the first client, such that the privacy of the first client is controlled.

Figure 11C:
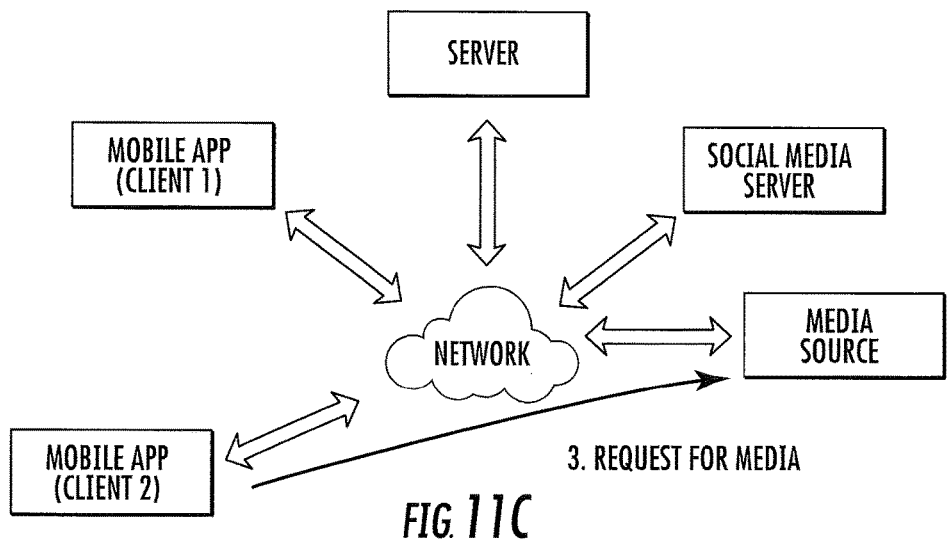
Figure 11D:
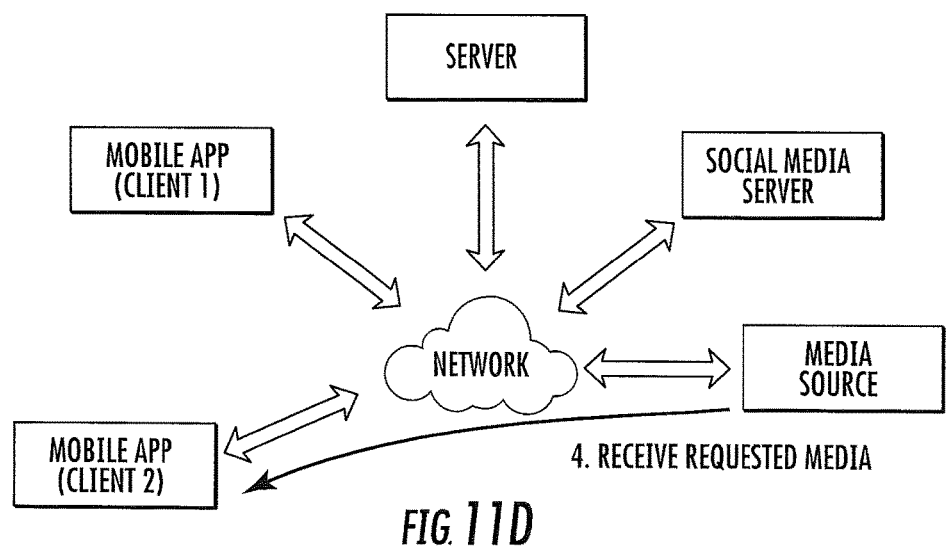

Referring to FIG. 11C, based on the received information, the second client can request media content items. For example, if the first client shared information regarding a particular song that he is listening to, the second client can request that media content item from a media source. As an example, if information regarding a song is shared, media sources can include a content storefront (e.g., iTunes, Google Music, and so forth) or a content streaming service (e.g., Rdio, Spotify, Pandora, and so forth). Referring to FIG. 11D, the requested media is then transmitted from the media source of the mobile application.

Implementations of the above system can be used to share information amongst several different users. For example, users can interact with their mobile application in order to playback media content items, recommend content items that they enjoy, and share their current activities with others. The users can also receive shared information from others, request content items referral to by other users, and playback the requested content items. As the content items are requested through a media source based on metadata, the content items themselves need not be transmitted between users. This allows users to quickly and legally share content items with others. In some implementations, however, content items can be transmitted between users; for example, in some cases, content items can be transmitted from each client to the server and/or social media server, or directly to another client.

Referring to FIGS. 11A-B, a variety of user and/or media information can be exchanged between the client and the server. For example, referring to FIG. 12, this information can include a username and password (e.g., associated with a particular user's account on the server), and profile information (e.g., information regarding the user, such as his identifying information, location, interests, contact information, and so forth). This information can also include information regarding one or more media content items, for example the user's favorite songs or other media content items, and playlists. This information can be transmitted in the form of metadata that identifies the content item (e.g., the title, album name, genre, year of release, and so forth) without transmitting the content itself. This information can also include social-media related information, such as an indication that the user is sharing information regarding the content item on a social media platform. This information can include one or more user connections (e.g., "friends" or other users with whom the user wishes to share the information). This information can also include the user's location (e.g., a GPS or geo-tagged event).

Referring again to FIGS. 11A-B, a variety of user and/or media information can be exchanged between the client and the social media server. For example, referring to FIG. 13, this information can include information regarding one or more media content items, for example the user's favorite songs or other media content items, and playlists. This information can also include an indication to share information regarding content items on the social media server. This information can be transmitted in the form of metadata that identifies the content item. This information can also include images and thumbnails (e.g., album art), relevant links (e.g., links to relevant websites).

Figure 14:
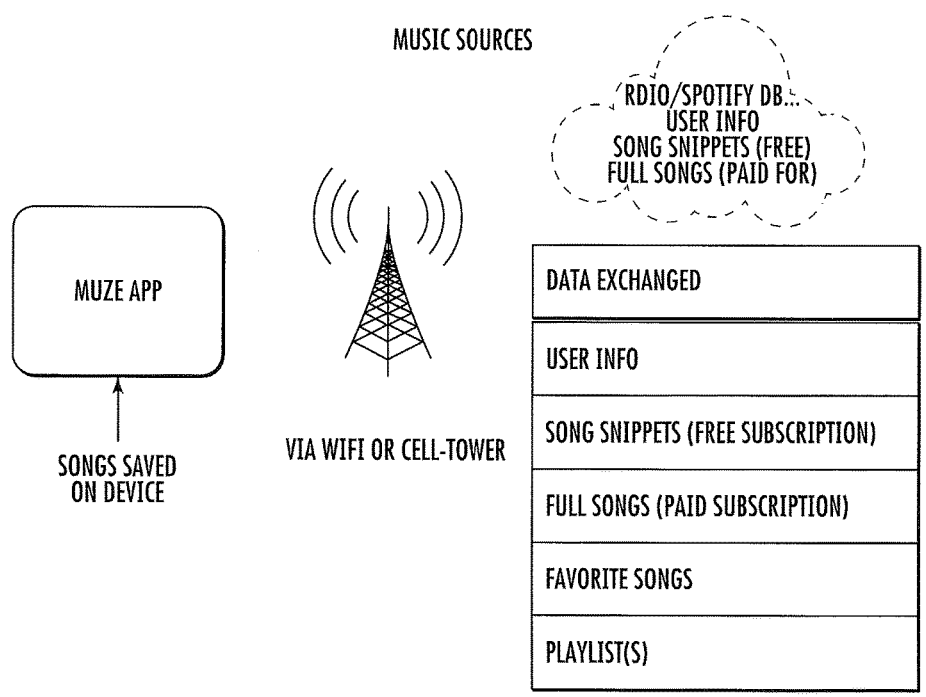
FIG. 14 shows example data transmitted between a mobile application and a media source.

Referring to FIGS. 11C-D, a client can request and received media content items from media sources, such that media content items need not be directly transmitted between clients. Referring to FIG. 14, information exchange between the mobile application and the media sources can include user information (e.g., a user's account information associated with the source source), portions of a media content item (e.g., a snippet or preview of a song), an entire media content item (e.g., a complete song), information regarding a user's favorite media content items, and playlists.

Figure 12:
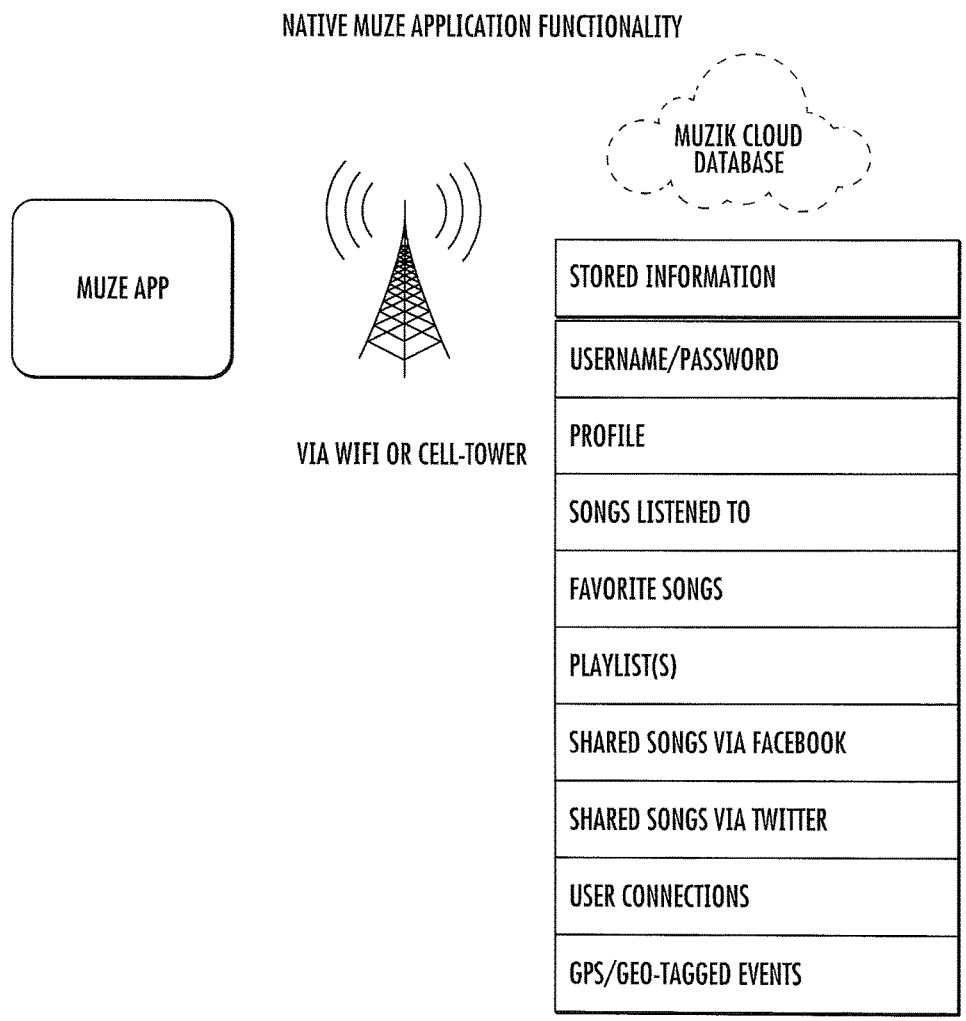
FIG. 12 shows example data transmitted between a mobile application and a server.
Figure 13:
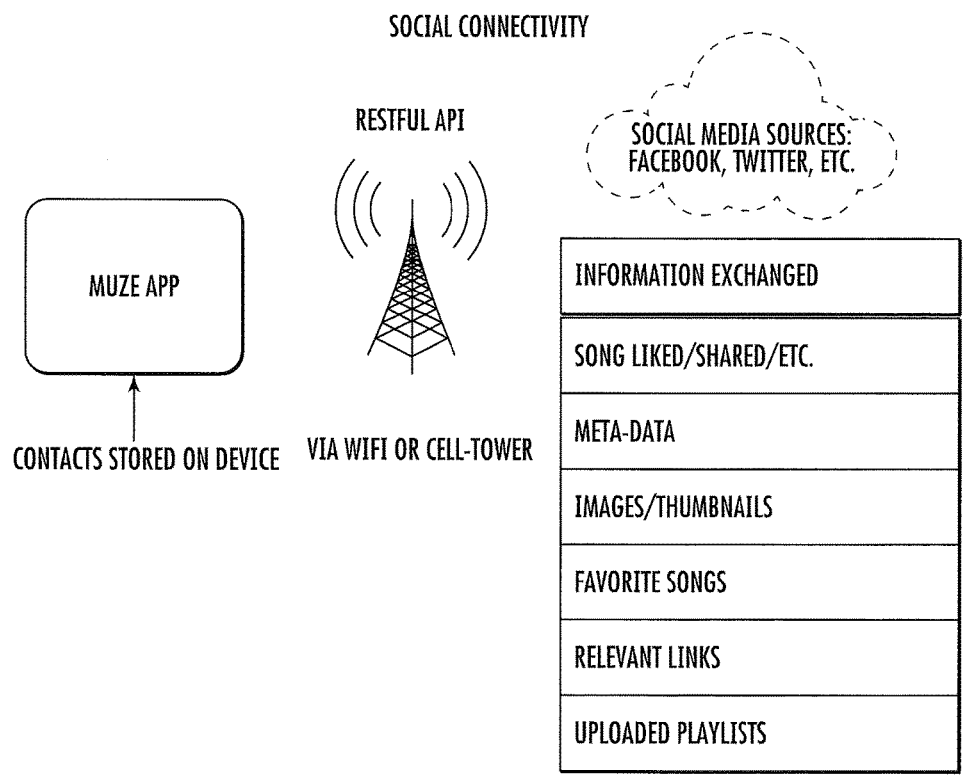
FIG. 13 shows example data transmitted between a mobile application and a social media server.

Although example information is shown in FIGS. 12-14, these are intended only as illustrative examples. In practice, other information can be exchange between each of the client devices, server, and social media server, either in addition to or instead of that described above. Further, although only two client devices, a single server, a single social media server, and a single media source are shown above, in practice a system can include any number of clients, servers, social media servers, and media sources.

Figure 15:
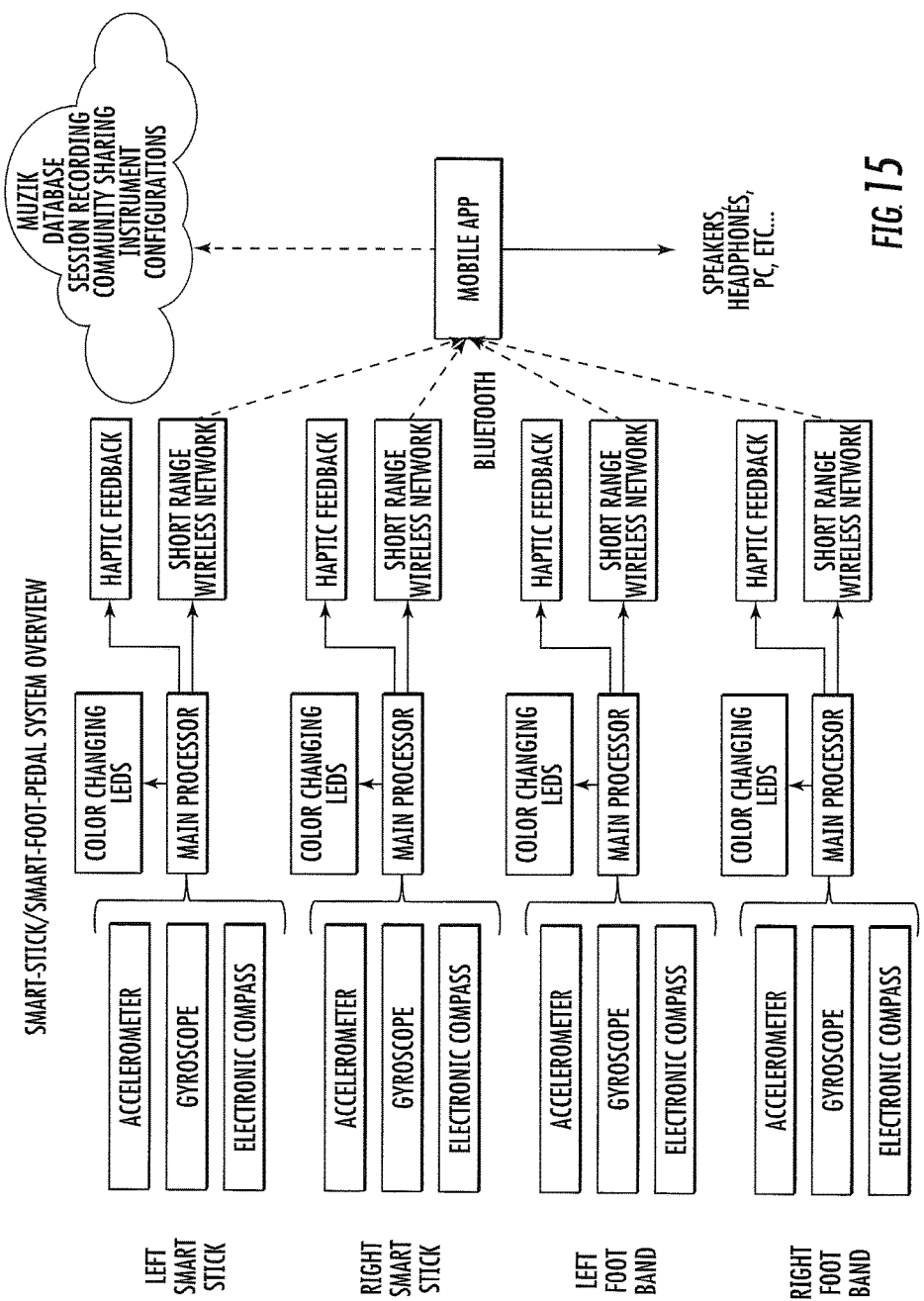
FIG. 15 is a diagram of another example system for accepting, interpreting, and transmitting user input.

Referring to FIGS. 1-6, an example system for accepting, interpreting, and transmitting user input is described in the context of an audio playback device, such as a headphone. Implementations of the system can implemented as a part of other devices, such as a video output device, a car media player, a dashboard panel, a visual or audio kiosk, a musical instrument, and the like. For example, referring to FIG. 15, a system for accepting, interpreting, and transmitting user input can be implemented as a part of an electronic drum set.

In an example implementation, the electronic drum set includes one or more drum sticks (e.g., a left and right drum stick) and one or more foot bands (e.g., a left and right foot band). Each of the drum sticks and foot bands includes sensors such as an accelerometer, gyroscope, and electronic compass. Each of the drum sticks and foot bands also include a main processor connected to the sensors, indicator LEDs, a wireless network module, and a haptic feedback module. Each of the drum sticks and foot bands connects wirelessly to a mobile application.

In a similar manner as described above, the drum sticks and foot bands can aggregate digital data into one or more data packets, then transmit the data packets to the mobile application using the wireless network module. For example, sensor data from the accelerometer, gyroscope, and electric compass can be transmitted to the main processor, which aggregates the sensor data into one or more data packets. These data packets are transmitted to the wireless network module, which wirelessly transmits the data packets to the mobile application.

In an example usage, a user holds a drum stick in each hand, and places a foot band on each foot. The user then moves the drum sticks and his feet around him in a manner that simulates playing a drum set. For example, the user can wave a drum stick in front of him in order to simulate playing a particular type of drum. As another example, the user can wave a drum stick to the side of him in order to simulate playing a different type of drum. As yet another example, the user can move his feet in a particular direction in order to simulate playing a particular type of foot pedal-activated drum. As yet another example, the user can move his feet in another direction in order to simulate playing a different type of foot pedal-activated drum. As the user moves the drum sticks and his feet, the sensors in the drum sticks and the foot bands detect information regarding the devices' acceleration, orientation, and movement. This information is used to determine the movement of each of the drum sticks and foot bands, and their respective locations about the user. This information is transmitted to the mobile application. Based on the location and motion of each of the drum sticks and foot bands, the mobile application plays back appropriate audio in order to stimulate the striking of a particular drum, and at an appropriate volume level in order to simulate the force with which the drum was struck. As the user continues moving the drum sticks and his feet, the mobile application continues playing back corresponding audio, thereby simulating a drum set being played.

Figure 16:
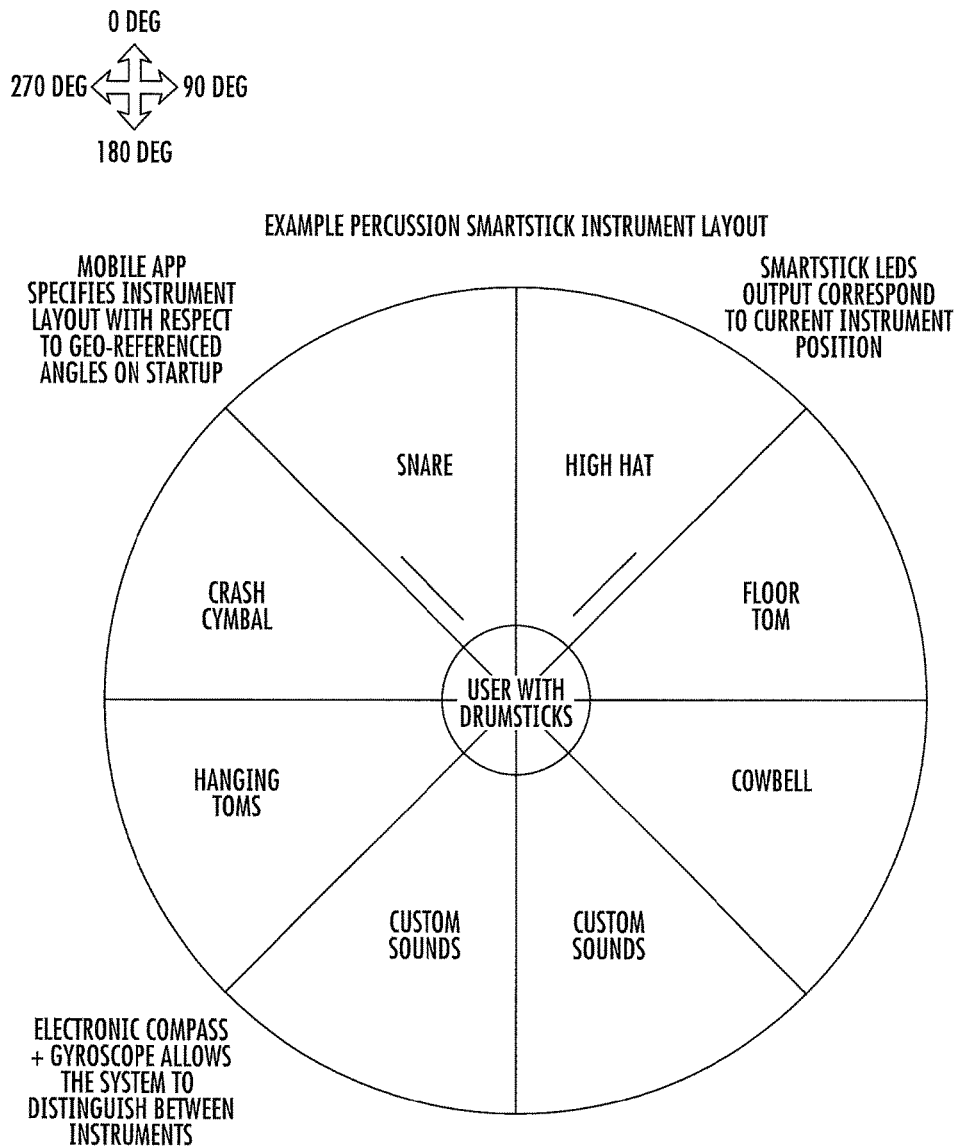
FIG. 16 is a diagram of several example regions about a user and their associated instruments.

As an example, referring to FIG. 16, the region about the user can be divided into several different regions based on an angle of deviation with respect to a particular direction. For instance, if 0° is the direction directly in front of the user, 275° to 0° might be associated with a first type of drum (e.g., a snare), 0-45° might be associated with a different type of type of drum (e.g., a high hat), 45°-90° might be associated with a different type of drum (e.g., a floor tom), and so forth). Based on the sensor information in each drum stick, the mobile application can detect a motion associated with playing back audio (e.g., a "striking" motion), identify the region in which the drum stick is being moved, and play back the appropriate sound.

Different sets of instruments can be associated with each of the drum sticks and the foot bands. For example, while the region 275° to 0° might be associated with a snare for the drum sticks, referring to FIG. 17, the region 275° to 0° might be associated with a double bass for the foot bands. Similarly, different instruments can be assigned to each of the regions. In this manner, each drum stick and/or foot band can be associated with different sets of instruments, depending on the implementation.

Figure 17:
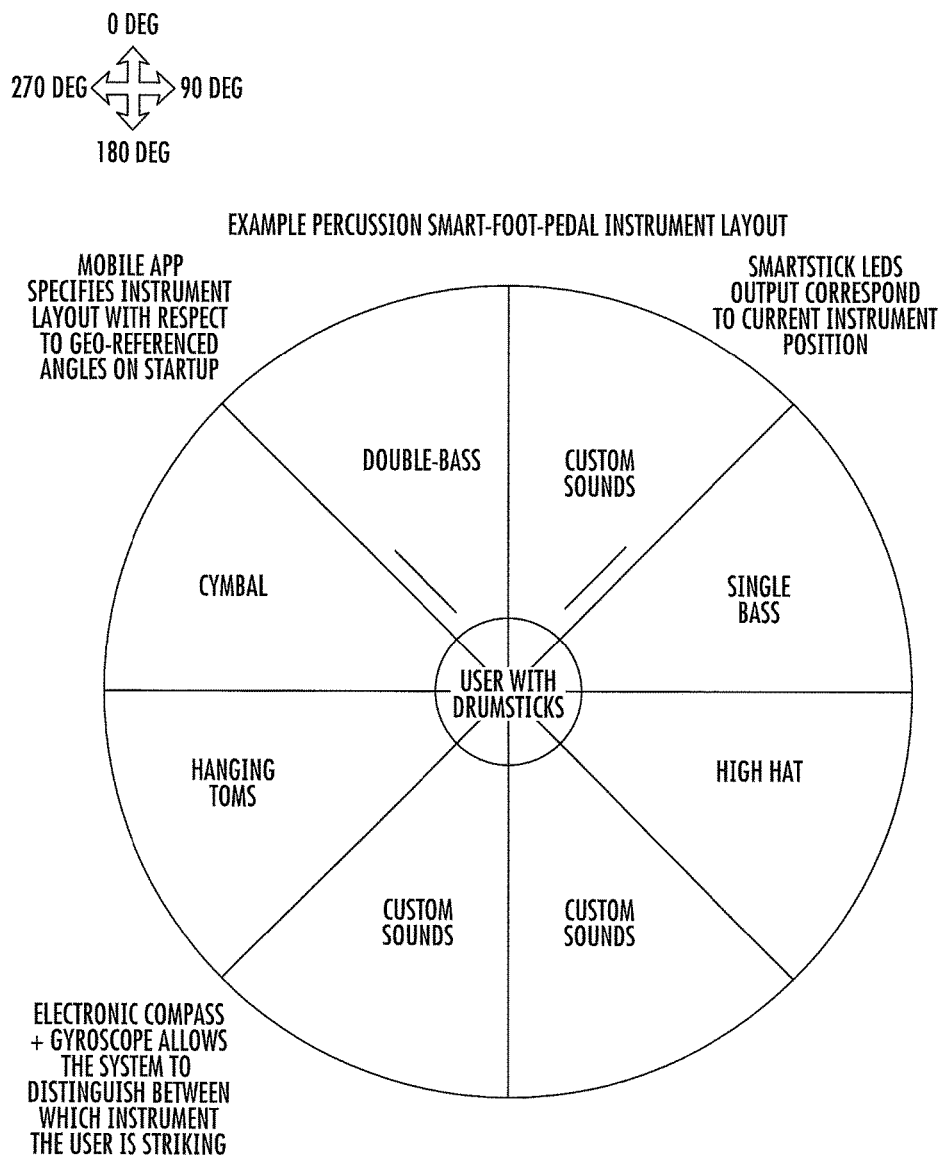
FIG. 17 is a diagram of several additional example regions about a user and their associated instruments.

Although example instruments and regions are shown in FIGS. 16-17, these are merely examples. In practice, the region about a user can be divided in any number of different ways, and each region can be associated with any one of a number of different instruments.

In some implementations, the mobile application can be connected to an audio playback device, such as speakers, a headphone, or a computer. In this manner, the simulated drum audio can be heard by the user and/or recorded for future playback. In some implementations, the mobile application records the playback (e.g., as a sound file or as a sequence of notes), such that the user's performance can be played back in the future. In some implementations, the mobile application allows the user to select different simulated instruments. For example, the user can select different types of drums or different types of instruments entirely. In some implementations, the mobile application allows the user to share the playback with others (e.g., by transmitting the stored playback to a server or directly to other users).

Figure 18:
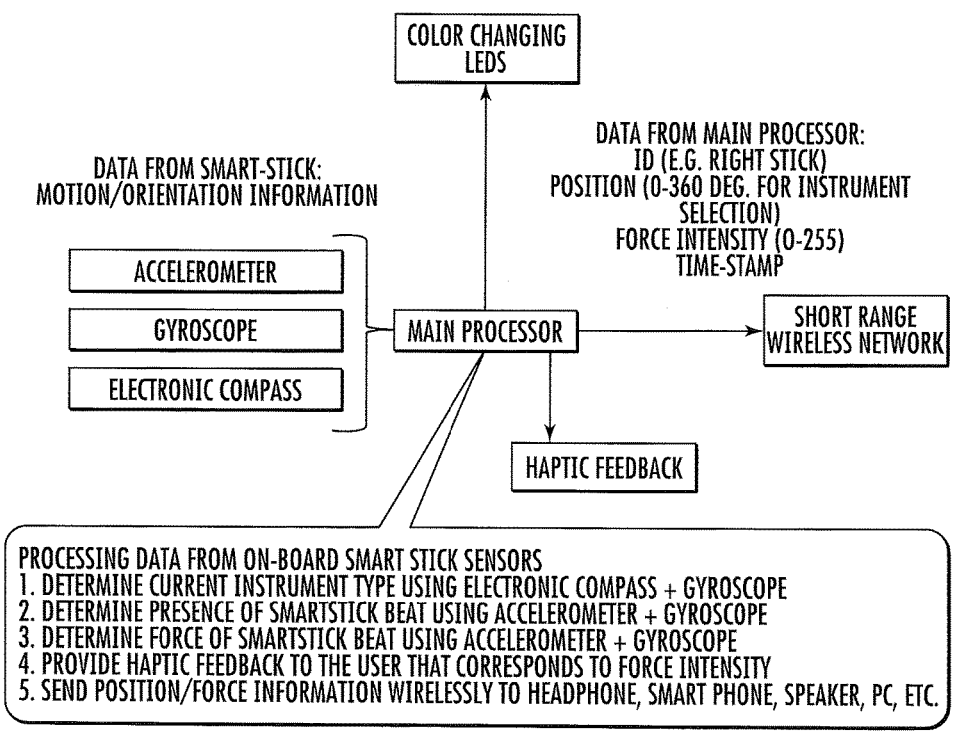
FIG. 18 shows various functions of an example main processor.

As described above, as the user moves the drum sticks and his feet, the sensors in the drum sticks and the foot bands detect information regarding the devices' acceleration, orientation, and movement. This information is used to determine the movement of each of the drum sticks and foot bands, and their respective locations about the user. In some implementations, this determination can be performed by the main processor. For example, referring to FIG. 18, in some implementations, the main process receives sensor data from the accelerometer, gyroscope, and electronic compass. Based on this information (e.g., the electronic compass and the gyroscope), the main processor can determine the location of the device relative to the user (e.g., an angle relative to the front of the user). Based on this information (e.g., the accelerometer and gyroscope), the main processor can also determine if the motion of the device corresponds to playing back audio (e.g., a "striking" motion). Based on this information (e.g., the accelerometer and gyroscope), the main processor can also determine if the force of motion of the device. This information is aggregated as a data packet, then transmitted to the wireless network module for transmission to the mobile application. For example, as shown in FIG. 16, the data packet can include a device identification (e.g., a particular one of the drum sticks or foot bands), a position (e.g., a particular angle relative to the front of the user), a force intensity (e.g., an integer value that represents the degree of force), and a time stamp indicating when the device was moved.

In some implementations, the device can also generate haptic feedback based on the force intensity. For example, if the user waves a drum stick with a particularly high degree of force, the drum stick can vibrate strongly to simulate hitting a drum very firmly. As another example, if the user waves a drum stick with a lower degree of force, the drum stick can vibrate more weakly to simulate hitting a drum more softly.

In some implementations, the main processor can also illuminate indicators LED to relay information to the user (e.g., the type of instrument selected, the power state of the device, and so forth).

Figure 19:
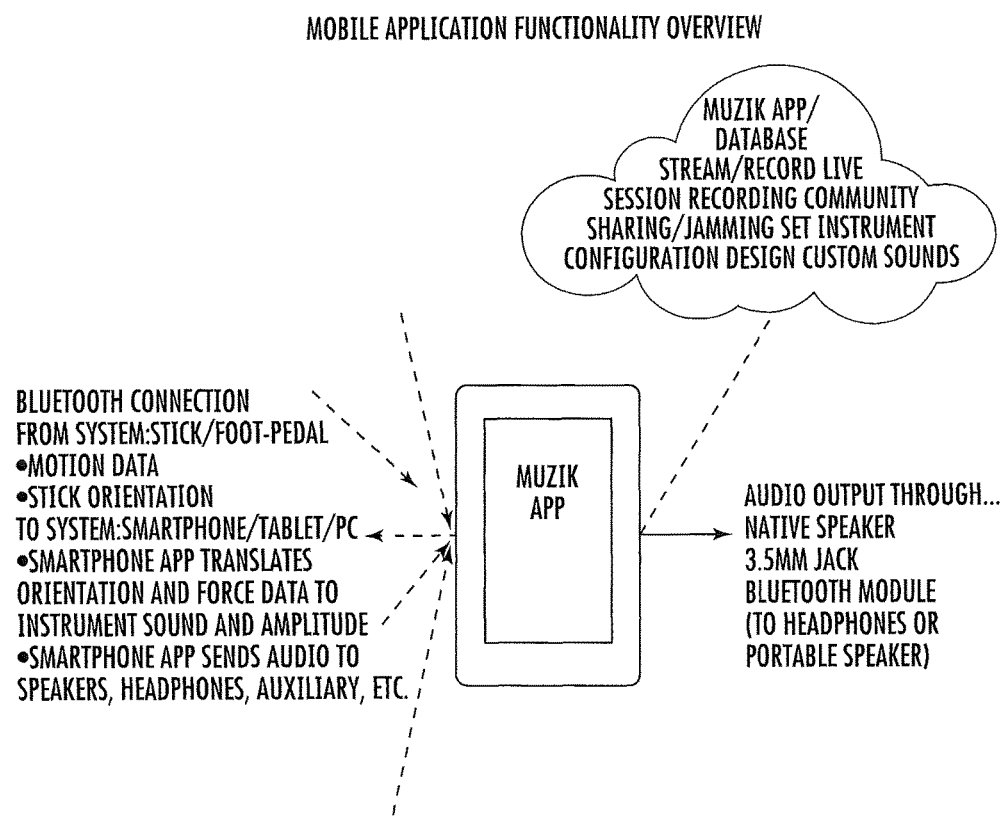
FIG. 19 shows various functions of an example mobile application.

As described above, information from the drum sticks and the foot bands are transmitted to the mobile application. Based on the location and motion of each of the drum sticks and foot bands, the mobile application plays back appropriate audio in order to stimulate the striking of a particular drum, and at an appropriate volume level in order to simulate the force with which the drum was struck. Referring to FIG. 19, the mobile application can play back audio using a native speaker (e.g., a speaker built into a device running the mobile application), an audio jack (e.g., a 3.5 mm jack), or a Bluetooth module to a pair of headphones or a speaker). Further, in some implantations, the mobile application can allow the user to select, for each region, different types of drums or different types of instruments entirely. In some implementations, the mobile application allows the user to share the playback with others (e.g., by transmitting the stored playback to a server or directly to other users), stream live playback with others (e.g., by transmitting live playback to others so that multiple can play simultaneously with each other), exchange instrument configurations, and design and exchange custom sounds.

Figure 20:
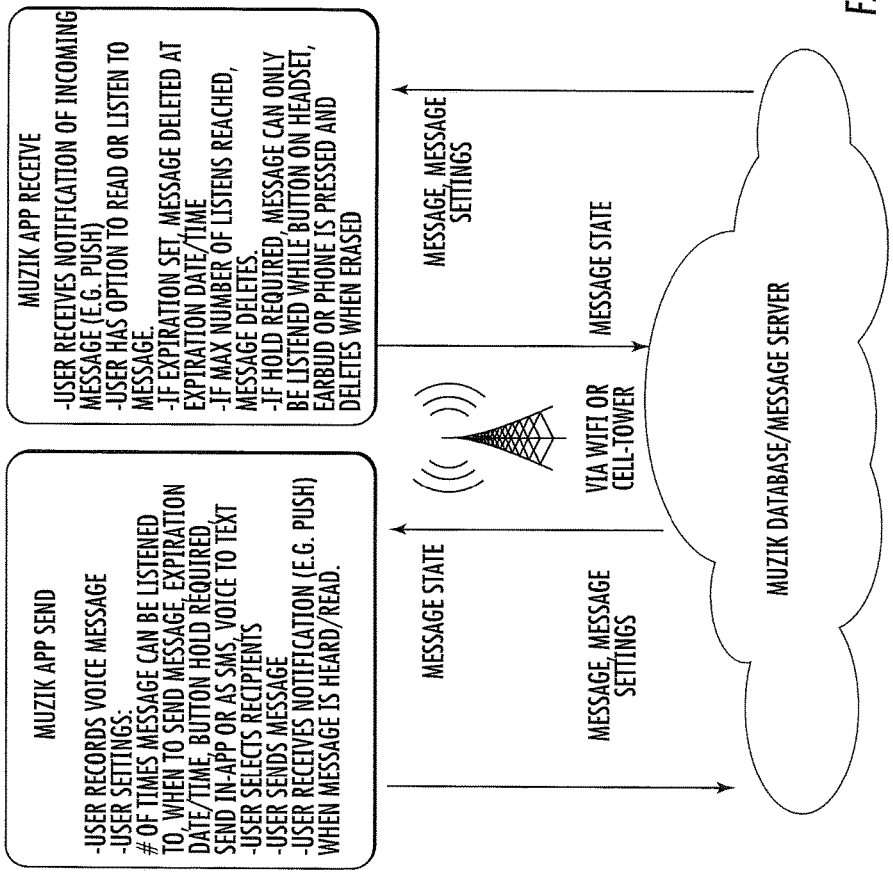
FIG. 20 shows various functions of an example disappearing messages system.

In the example shown in FIG. 20 is an overview of a disappearing messages system according to embodiments of the present invention. It will be appreciated by one of skill in the art that disappearing or ephemeral messages include messages that "self-destruct," delete and/or auto-delete according to settings/parameters determined by a user/sender of the disappearing messages system. The disappearing message system can be controlled using, for example, a headphone, earbud, smart cable, smartphone, or implementations, such as voice recognition software that: initiate; send/receive; contact selection and confirmation; message content; and message settings, operating on headphones, earbuds, smart cables and smartphones. Any combination of controls/platforms described above can be used to control a disappearing message app.

Information stored, for example on a database/message server, may include: the sender; recipients; message settings; a pointer to audio/text files; and message state, for example, number of times a message has been listened to and/or read. The database/message server for the disappearing message system may be accessed, for example, via WiFi networks or cellular networks, however, access is not limited thereto.

In some embodiments, a sender using, for example, an app of the disappearing message system to send and/or receive disappearing messages, controlled by any combination of controls/platforms described above, may record a voice message. The user may select settings/parameters for the voice message, for example, number of times the message can be listened to, when the message will be sent, expiration date/time for the message, button hold required for a recipient to access message, and whether the message is sent in-app, or as an SMS, or as a voice to text message. The user may select recipients of the disappearing message, and after sending the disappearing message, the user may receive notification, for example, a push notification, when a message has be read and/or heard by a recipient(s).

The message and message settings selected by the sender may be transmitted to the database/message server over a network, and the message state when, for example, read and/or heard by a recipient of the message, may be transmitted back to the sender. Recipients using, for example, an app of the disappearing message system to send and/or receive disappearing messages, selected by the sender to receive the disappearing message, may receive a notification, for example, a push notification, of an incoming disappearing message from the sender, through the database/message server. The recipient may have the option to read and/or listen to the message. Given the message settings selected by the sender, such as, an expiration date/time and/or maximum number of listens is reached, the disappearing message will be deleted. In some embodiments, if the message sender selects a button hold necessary for recipient access, the message, for example, can only be listened to while a button on a headset, earbud or phone is pressed and/or held by the recipient of the disappearing message, and the message deletes when erased. The message state from the recipient may be transmitted back to the database/network server, and then may be transmitted back to the sender.

The implementations described here are not limited to headphones, but can be incorporated into dongles, or other external input devices. The methods of creating layered content and interacting with programs and content hosted on a base device via commands entered into a remote device can be implemented in video devices or headphones/video combinations.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features of one or more example implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for sharing content between users, comprising:
   a. transmitting content to a headphone of a user, wherein the content is associated with metadata identifying the content;
   b. identifying a hand gesture performed by the user on a touch pad associated with the headphone, wherein the hand gesture determines a user preference related to the content;
   c. transmitting information regarding the hand gesture from the headphone to a mobile device;
   d. receiving the information regarding the hand gesture at the mobile device; and
   e. transmitting the user preference, related to the content determined by the hand gesture, and the metadata to a network,
   wherein the user preference transmitted to the network comprises a disappearing message comprising: a number of times the disappearing message can be accessed; a time at which the disappearing message is sent; and/or an expiration date or time for the disappearing message, wherein the disappearing message is transmitted through a mobile device application, and wherein the disappearing message comprises a voice message recorded by the user.

2. The computer implemented method of claim 1, wherein the hand gesture performed by the user on the touch pad comprises a swipe on the touch pad, a tap on the touch pad, a multi-finger touch on the touch pad, a swipe and hold on the touch pad, a swipe in more than one direction on the touch pad, or contact with the touch pad in more than one location.

3. The computer implemented method of claim 1, wherein the hand gesture performed by the user on the touch pad is associated with one or more commands indicating a user preference, the user preference comprising a command to share, indicate a like, indicate geographic location, indicate rating, indicate a purchase, or a command to gift the content.

4. The computer implemented method of claim 1, wherein the information regarding the hand gesture received at the mobile device is translated by the mobile device to determine a specific user preference related to the content being played on the headphone.

5. The computer implemented method of claim 1, wherein the information regarding the hand gesture received at the mobile device is translated by the mobile device to produce a command to share the metadata identifying the content played on the headphone with one or more other users connected to the network.

6. The computer implemented method of claim 5, wherein the network is one or more of the following: a LAN; a WAN; an inter-network; a peer-to-peer network; and a cellular network.

7. The computer implemented method of claim 5, wherein the one or more other users is connected to the network by a cellular phone, a tablet, a media player, a gaming device or a personal computer.

8. The computer implemented method of claim 5, wherein the network comprises a server, wherein user preference related to the content and metadata identifying the content is transmitted to the server, and wherein the user preference related to the content and metadata identifying the content is shared from the server with one or more other users connected to the network.

9. The computer implemented method of claim 8, wherein the network further comprises a social media server, wherein user preference related to the content and metadata identifying the content is transmitted to the social media server, and wherein the user preference related to the content and metadata identifying the content is shared from the social media server with one or more other users connected to the network.

10. The computer implemented method of claim 9, wherein the network further comprises a media source comprising media content, wherein one or more other users connected to the network can request media content and wherein the media source can transmit the media requested media to the one or more other users.

11. The computer implemented method of claim 1, wherein the mobile device is a cellular phone, a tablet, a media player, a gaming device or a personal computer.

12. The computer implemented method of claim 1, wherein the network to which the user preference related to the content indicated by the hand gesture and metadata identifying the content are transmitted is a social network.

13. The computer implemented method of claim 1, wherein the disappearing message comprises a voice to text message.

14. The computer implemented method of claim 1, wherein the disappearing message is deleted at a set expiration date or time after the disappearing message is sent.

15. The computer implemented method of claim 1, wherein the disappearing message is deleted after the disappearing message has been accessed a maximum number of times.

16. The computer implemented method of claim 1, wherein the user selects one or more other users that receive the disappearing message, and wherein the user receives notification when the disappearing message is heard or read by one of the one or more other users.

17. The computer implemented method of claim 1, wherein one or more other users receives notification that the disappearing message is incoming.

18. The computer implemented method of claim 17, wherein the one or more other users has an option to read or listen to the disappearing message.

19. A computer implemented method for sharing content between users, comprising:
   a. transmitting content to a headphone of a user, wherein the content is associated with metadata identifying the content;
   b. identifying a hand gesture performed by the user on a touch pad associated with the headphone, wherein the hand gesture determines a user preference related to the content;

c. transmitting information regarding the hand gesture from the headphone to a mobile device;
d. receiving the information regarding the hand gesture at the mobile device; and
e. transmitting the user preference, related to the content determined by the hand gesture, and the metadata to a network, wherein the user preference transmitted to the network comprises a disappearing message, wherein the disappearing message comprises a voice to text message.

20. A computer implemented method for sharing content between users, comprising:
a. transmitting content to a headphone of a user, wherein the content is associated with metadata identifying the content;
b. identifying a hand gesture performed by the user on a touch pad associated with the headphone, wherein the hand gesture determines a user preference related to the content;
c. transmitting information regarding the hand gesture from the headphone to a mobile device;
d. receiving the information regarding the hand gesture at the mobile device; and
e. transmitting the user preference, related to the content determined by the hand gesture, and the metadata to a network, wherein the user preference transmitted to the network comprises a disappearing message, wherein the user selects one or more other users that receive the disappearing message, and wherein the user receives notification when the disappearing message is heard or read by one of the one or more other users.

* * * * *